United States Patent [19]
Shimotori

[11] 3,845,377
[45] Oct. 29, 1974

[54] ROTATIONAL ANGLE TRANSDUCER

[75] Inventor: Akira Shimotori, Tokyo, Japan

[73] Assignee: Nihon Regulator Co., Ltd., Tokyo, Japan

[22] Filed: Apr. 13, 1973

[21] Appl. No.: 350,983

[30] Foreign Application Priority Data
Apr. 20, 1972 Japan.............................. 47-39951

[52] U.S. Cl.................. 318/662, 324/61 R, 328/1, 340/200
[51] Int. Cl.... G05b 1/06, G01r 27/26, G01n 27/00
[58] Field of Search........ 324/61 R, 61 P; 340/200; 328/1; 307/119; 318/662

[56] References Cited
UNITED STATES PATENTS
| | | | |
|---|---|---|---|
| 2,534,505 | 12/1950 | Ergen............................ | 340/200 X |
| 3,221,256 | 11/1965 | Walden............................ | 324/61 P |
| 3,371,568 | 3/1968 | Felix.................................. | 324/61 P |

Primary Examiner—Stanley T. Krawczewicz
Attorney, Agent, or Firm—Lloyd L. Zickert

[57] ABSTRACT

A contactless rotational angle transducer for developing an output signal indicative of the angular position of a rotatable object comprising a fixed stator plate having a plurality of electrically isolated sector members, a parallel spaced-apart confronting plate, and a sector rotor plate situated between the stator and confronting plates and rotatably coupled to the rotatable object. An AC excitation voltage is impressed at a fixed phase relationship on each sector member such that the voltage induced in the confronting plate is a function of the angular position of the rotor plate. A pulse generator circuit responsive to the relative phase difference between the voltage induced on the confronting plate and the applied excitation signal develops a pulse-width modulated or pulse-position-modulated output signal indicative of the angular position of the rotatable object, wherein the number of complete or partial turns of the rotatable object can be measured.

15 Claims, 20 Drawing Figures

PATENTED OCT 29 1974

ROTATIONAL ANGLE TRANSDUCER

This invention in general relates to transducers, and more particularly to a contactless rotational angle transducer which converts the physical rotation angle of a rotatable object into an electrical signal.

Rotational angle transducers are often utilized in remote telemetry applications such as for monitoring a liquid level in a tank where a high degree of resolution and a high rate of response are required. Such transducers must provide safe and reliable performance over a long period of time, often under adverse environmental conditions. Heretofore it has been difficult to find rotational angle transducers that meet such requirements. One known form of rotational angle transducer measures the rotation angles of rotatable objects by means of coded discs or potentiometers, which requires one or more sliding electrical contacts. These contacts tend to introduce errors when they fail to make good electrical contact, which may result either from wear or contamination by the environment. To eliminate the shortcomings of sliding contacts, the use of a contactless magnetic sensor head has been proposed which includes a mechanical scanning mechanism for scanning the magnetic head with a scan motor and a permanent magnet, and which resulted in a long start-up time and a short operating life. Another proposed method utilized a polyphase alternating current to generate a rotating magnetic field by which scanning was accomplished which, however, required a complex mechanical structure. Another proposed rotation angle transducer employs rotary capacitors to measure the rotation angle through the level of the voltage obtained therefrom. High accuracy, however, was not obtainable from this type of transducer.

The present invention provides a rotational angle transducer which is suitable for use as the transmitter in a remote telemetry system whereby physical rotation angles are measured in terms of pulse-position-modulated, pulse-phase-modulated or pulse-width-modulated electric signals, and which uses no sliding electrical contacts. This eliminates the errors which heretofore resulted from sliding contacts making insufficient electrical connection, achieves a higher response speed and longer life by avoiding the use of mechanical scanning means, and permits the transducer to be manufactured at a reduced cost because of its simpler structure.

Accordingly, the invention is directed to a contactless rotational angle transducer for generating an output signal indicative of the angular position of a rotatable member. The transducer comprises a stator plate divided into a plurality of electrically insulated sector members, and means for impressing excitation voltages on adjacent ones of the sector members, the phase of each impressed voltage differing from that impressed on adjacent members. A confronting plate is disposed in parallel spaced-apart relationship to the stator plate so as to develop an induced voltage in response to the impressed exciting voltages on the sector members of the stator plate. A sector rotor plate rotatably coupled to the rotatable member and disposed in parallel relationship between the stator plate and the confronting plate is provided for modifying the voltage induced on the confronting plate, and signal generating means responsive to the signal induced in the confronting plate are provided for generating an output signal indicative of the angular position of the rotatable member.

It is therefore an object of this invention to provide a rotational angle transducer for converting rotational angles to an electrical output signal which is suitable for remote telemetry and which eliminates the aforementioned shortcomings of previously proposed rotational angle transducers.

Another object of the invention is to provide a contactless rotational angle transducer for remote telemetry which is of simple and economical construction, capable of producing accurate measurements, capable of fast response and capable of long life.

Other objects, features and advantages of the invention will be apparent from the following detailed disclosure, taken in conjunction with the accompanying sheets of drawings, wherein like reference numerals refer to like parts, in which.

Figure 1:
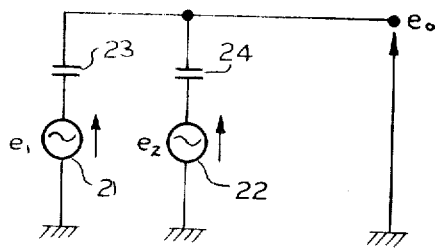
FIGS. 1 and 2 are simplified schematic diagrams of the rotary capacitor portion of the transducer useful in explaining its operation.

The operation of the transducer of the invention can be best explained by reference to the simplified schematic diagrams of FIGS. 1–8, and the simplified structural diagrams of FIGS. 7 and 8. Considering first the rotary capacitor portion of the transducer, FIG. 1 shows two AC signal excitation sources 21 and 22 connected through two capacitors 23 and 24 to a common output terminal. Assuming that the instantaneous voltage levels of these AC signal sources are $e_1$ and $e_2$ and the instantaneous voltage level at the output terminal is $e_0$, and that each voltage is referenced to zero volts, then the output voltage $e_0$ can be obtained from the following formula:

$$e_0 = (e_1 - e_2) c_1/c_1 + c_2 + e_2 \qquad (1)$$

where $c_1$ and $c_2$ correspond to capacitors 23 and 24, respectively.

Figure 2:
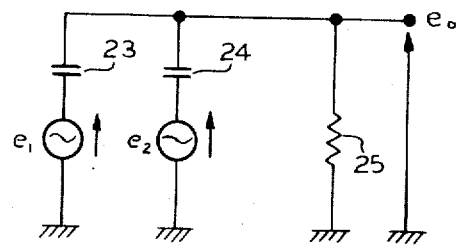

FIG. 2 illustrates the same circuit except that a resistor 25 of high resistance is connected to the output terminal. The output voltage $e_0$ is now:

$$e_0 \approx (e_1 - e_2) c_1/c_1 + c_2 + e_2 \qquad (2)$$

The accuracy of formula (2) depends on the relative impedance $R_0$ of resistor 25 and the impedances presented by capacitors 23 and 24 against variations in the instantaneous voltage values $e_1$ and $e_2$ of the two AC signal sources. Where a substantially longer time period has elasped than the time constant $T$ of the circuit components, $$T = (c_1 + c_2) \cdot R_0 \qquad (3)$$

the output voltage $e_0$ is not affected by the initial level of each voltage. In order that the relationship of formula (2) be established at each instant, the mean voltage levels of $e_1$ and $e_2$ must be zero, i.e., there must be no DC component in AC sources $e_1$ and $e_2$. Thus, the output signal $e_0$ contains the AC component only, even if there is a DC offset voltage in $e_1$ and $e_2$ because the offset voltage is automatically eliminated.

Figure 3:
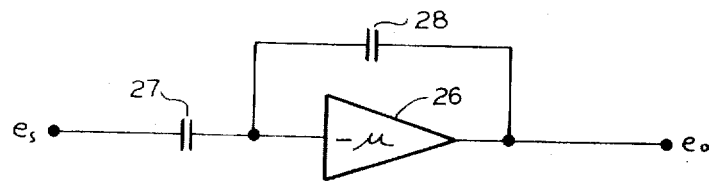
FIGS. 3–5 are simplified schematic diagrams of the signal processing portion of the transducer useful in explaining its operation.

FIG. 3 illustrates a circuit which is commonly known as charge amplifier. This circuit amplifies or buffers in an amplifier 26 the signal $e_s$ obtained from a capacitive signal source and gives the output signal $e_0$. Assuming that the capacity of the input capacitor 27 is $c_i$ and that of the feedback capacitor 28 is $c_f$, the voltage transfer function G can be expressed:

$$G = e_0/e_s = -c_i/c_f \qquad (4)$$

Figure 4:
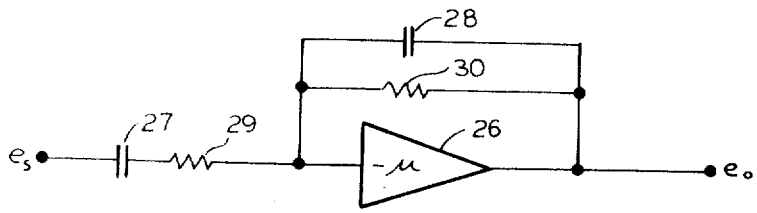

FIG. 4 illustrates a refinement of the circuit shown in FIG. 3. A resistor 29 of impedance $R_i$ is connected in series with capacitor 27 while another resistor 30 of impedance $R_f$ is connected in parallel with capacitor 28. Under this condition, the transfer function G is expressed as:

$$G \sim -c_i/c_f \qquad (5)$$

The accuracy of equation (5) is dependent on the magnitude of impedances $R_i$ and $R_f$ relative to the impedances developed by capacitors 27 and 28, of capacities $c_i$ and $c_f$, respectively against the variation in the voltage levels of $e_s$ and $e_0$. The relationship of FIG. 3 to FIG. 4 or that of formula (4) to formula (5) corresponds to the relationship of FIG. 1 to FIG. 2 or that of formula (1) to formula (2).

Figure 5:
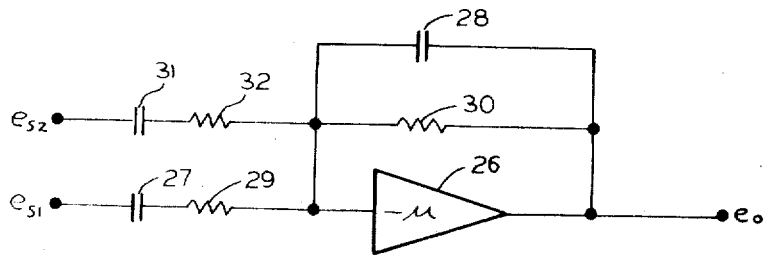

FIG. 5 shows the circuit of FIG. 4 expanded to algebraically add two input signals by the addition of another input capacitor 31 and series resistor 32. Assuming that the signals at these inputs are $e_{s1}$ and $e_{s2}$, and that the output signal is $e_0$, the input-to-output relationship can be expressed:

$$-e_0 \sim 1/c_f (c_3 \cdot e_{s1} + c_4 \cdot e_{s2}) \qquad (6)$$

where $c_3$ and $c_4$ correspond to capacitors 27 and 31, respectively.

Figure 6:
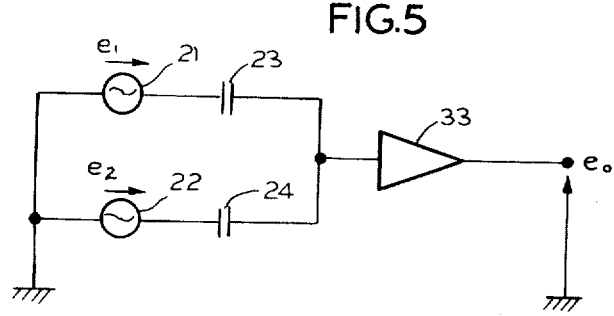
FIGS. 6 and 7 are simplified schematic and mechanical diagrams for the transducer which is useful in explaining its operation.

For simplification, the negative and positive signs will henceforth be omitted. Furthermore, unless otherwise stated, the output voltage of the transducer of the invention will henceforth refer to a voltage to be obtained through a buffer amplifier 33 which will be understood to be substantially identical in structure and operation to that previously described in FIG. 5. Therefore, with a buffer amplifier 33 connected to the output of the voltage generator illustrated in FIG. 1 and with suitable circuit constants selected, the output voltage $e_0$ of the basic system as shown in FIG. 6 becomes:

$$e_0 = c_1 \cdot e_1 + c_2 \cdot e_2 \qquad (7)$$

where $c_1$ and $c_2$ correspond to capacitors 23 and 24, respectively.

Figure 7:
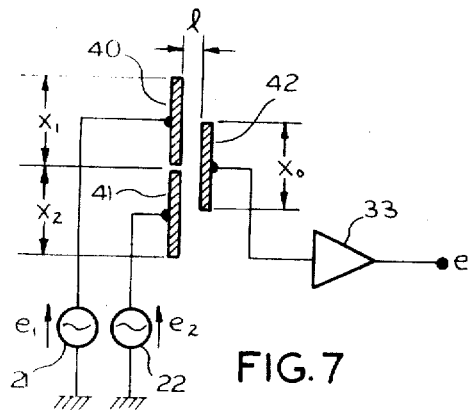
Figure 8:
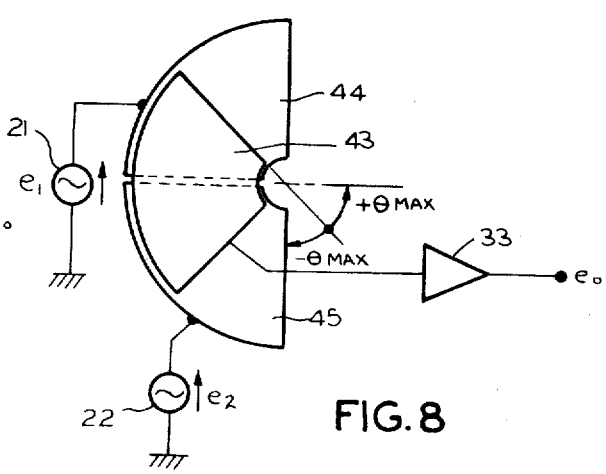
FIG. 8 illustrates a simplified mechanical construction for the transducer which is useful in explaining its operation.

An appropriate physical construction for capacitors 23 and 24 is shown in FIG. 7. Assuming that the lengths $X_1$, $X_2$ and $X_0$ of the capacitor plates 40, 41 and 42 illustrated in FIG. 7 are equal, and that the depths of these plates are also equal so that their areas are equal, and that the distance $l$ between these plates is held constant, the output voltage $e_0$ from this configuration becomes:

$$e_0 = \tfrac{1}{2} e_1 + \tfrac{1}{2} e_2 \qquad (8)$$

with selection of a suitable constant.

In FIG. 7, assuming $X_1 = X_2 = X_0 = 2X$ and that the plate 42 is vertically movable as much as the maximum distance $X$, the output voltage $e_0$ obtained with the plate 42 moving as far as a distance $\delta$ can be expressed:

$$e_0 = \tfrac{1}{2} \{\delta/X (e_1 - e_2) + (e_1 + e_2)\} \qquad (9)$$

wherein the value of $\delta$ is $-X \leq \delta \leq X$ (the negative and posivite signs merely indicate downward and upward directions). With the plate 42 equally covering the plates 40 and 41 as shown in FIG. 7, the value of $\delta$ is zero.

In FIG. 7 the plate 42 is assumed to be movable in the vertical direction. However, the same operating principle applied also to an arrangement where the plate 42 is replaced by a rotary plate. Referring to FIg. 8, the vertically moving plate 42 of FIG. 7 is replaced by a wedge-shaped rotary sector plate member 43. Stationary plates 40 and 41 are similarily replaced by wedge-shaped stationary sector plate members 44 and 45. These members all have congruent sector shapes of ½π. The output voltage $e_0$ obtained with the plate 43 turned as far as a rotation angle $\theta$ can be expressed:

$$e_0 = \tfrac{1}{2}\{4/\pi\ \theta\ (e_1 - e_2) + (e_1 + e_2)\} \quad (10)$$

where $-\pi/4 \leq \theta \leq \pi/4$ (the negative or positive sign indicates the direction of rotation only). The value of $\theta$ is zero when plate 43 is in a position equally covering plates 44 and 45, as shown in FIG. 8.

Figure 9:
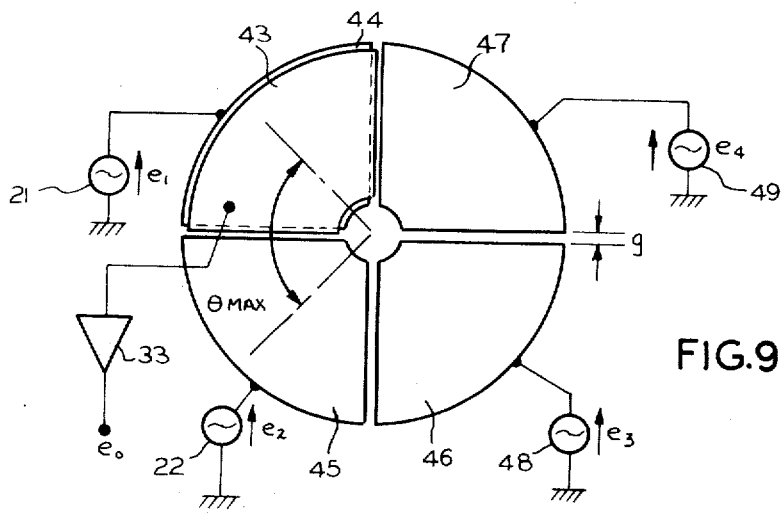
FIG. 9 illustrates a preferred construction of the transducer of the present invention.

The fundamental operation of the transducer of the invention has thus far been explained by means of the simplified equivalent circuits and constructions shown in FIGS. 1-8. Based on these fundamentals, it will be appreciated that a power supply of $n$ phases (where $n \geq 3$) may be employed as an excitation power supply. FIG. 9 represents the basic structure of a preferred four phase ($n=4$) rotational angle transducer constructed in accordance with the invention. In this case four sector stator plates 44 through 47 are employed, the two additional stator plates 46 and 47 being supplied by two additional AC excitation signal sources 48 and 49, respectively. FIG. 9 shows the transducer in a state in which the rotary plate 43 is completely superposed on plate 44. Let us assume that the rotation angle $\theta$ of plate 43 in this position is 0, and that $0 \leq \theta \leq \pi/2$ for purposes of discussion. Assuming further that plate 43 comes to be completely superposed on another plate 45 at a rotation angle $\theta = \pi/2$, and that the output voltage $e_0$ may be found from equation (10), $e_0$ for the structure shown in FIG. 9 can be found from:

$$e_0 = 2/\pi\ \theta\ (e_2 - e_1) + e_1 \quad (11)$$

Assuming that $e_1$ and $e_2$ are of triangular waveform and the half-wave peak values of these triangular waves are equal to each other and may be expressed as $K/2$, and further assuming that the phase $\phi$ of the triangular wave is $\phi = \phi + \phi'$, the output voltage $e_0$ of the transducer when $\phi' = 0, \pi/2, \pi,$ and $3/2\pi$, with $0 \leq \phi < \pi/2$, may be derived from equation (11) as shown by the following table:

negative-to-positive or positive-to-negative transition point which satisfies the equations $$e_0 = K/\pi\ (\phi - \theta) = 0 \quad (12)$$

and $$e_0 = K/\pi\ (\theta - \phi) = 0 \quad (13)$$

is $\phi = \theta$. From the foregoing, it can be concluded that (1) each cycle of the output signal has one transition point from negative to positive and another point from positive to negative only, (2) the transition point is proportional to the rotation angle $\theta$ of the plate 43, and (3) the transition point is not dependent on the voltage of the exciting power supply. Furthermore, by differentiating the value of $e_0$ in the region of $\phi' = 0$ and $\pi$ with $\phi$, the slope of $e_0$ is obtained:

$$de_0/d\phi = K/\pi \quad (14)$$

$$de_0/d\phi = -K/\pi \quad (14')$$

Since $\theta$ does not appear, it can be further concluded that (4) the slope of $e_0$ at the transition point is constant irrespective of the position $\theta$ of plate 43.

When the value of $e_0$ at each of the specific phase angles $\phi = 0, \pi/2, \pi$ and $3/2\pi$ is inserted in the above equation, each becomes a transition point when the plate 43 is completely superimposed on plates 44 or 45 and $e_0$ equals $e_1$ or $e_2$. Thus, a perfect continuity is maintained.

Assuming that, in FIG. 9, the excitation power supplies $e_1, e_2, e_3,$ and $e_4$ apply signals identical in waveform but shifted in phase from one another by ½π to the respective stator sectors, the abovedescribed relationship of the plate 43 to the two adjacent plates 44 and 45 applies in exactly the same manner to any to adjacent plates of the four plates 44–47. This assumes continuity of output.

Figure 10:
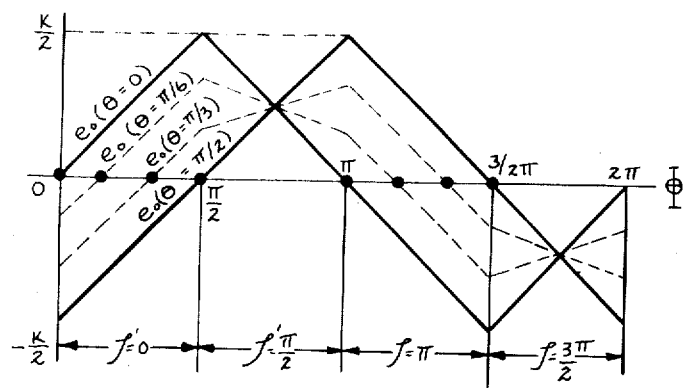
FIG. 10 is a presentation of waveforms useful in explaining the operation of the transducer of the invention.

FIG. 10 illustrates the relationship of the output waveform to the angle of rotation as shown in FIG. 9. In FIG. 10, the output voltage $e_0$ equals $e_1$ when the rotation angle of plate 43 is zero ($\theta = 0$) and equals $e_2$ when the rotation angle is $\pi/2$ ($\theta = \pi/2$). The output voltages obtained at $\theta = \pi/6$ and $\theta = \pi/3$ are indicated by dotted lines. The transition points when $\theta$ equals 0, $\pi/6, \pi/3$ and $\pi/2$ are derived from the transition point $\phi = \theta$ relationship, and are indicated in FIG. 10 by heavy dots.

| $\phi'$ | 0 | $\pi/2$ | $\pi$ | $3/2\ \pi$ |
|---|---|---|---|---|
| $e_1$ | $K/\pi\ \phi$ | $-K/\pi\phi + K/2$ | $-K/\pi\ \phi$ | $K/\pi\phi - K/2$ |
| $e_2$ | $K/\pi\ \phi - K2$ | $K/\pi\phi$ | $-K/\pi\phi + K/2$ | $-K/\pi\phi$ |
| $e_2 - e_1$ | $-K/2$ | $2K/\pi\phi - K/2$ | $K/2$ | $-2K/\pi\phi + K/2$ |
| $e_0$ | $K/\pi\ (\phi-\theta)$ | $2/\pi\theta\ (2\ K/\pi\ \phi - K/2)-K/\pi\phi + K/2$ | $K/\pi\ (\theta-\phi)$ | $2/\pi\theta\ (-2K/\pi\phi+K/2) + K/\pi\phi - K/2$ |

The value of the output signal $e_0$ at each point in $\phi = \pi/2 \times n$ (where $n = 0,1,2,$ and $3$) is determinable by computation with finite numbers. Referring to the above table, we see that $e_0$ is greater than zero in the region of $\phi' = \pi/2$ and that $e_0$ is less than 0 in the region of $\phi' = 3/2\pi$. Accordingly, the only regions that can have a negative-to-positive or positive-to-negative transition point are $\phi' = 0$ or $\phi' = \pi$. In other words, the The foregoing description with reference to FIG. 9 has covered a rotation of plate 43 up to $\pi/2$, where plate 43 is completely superposed on plate 45. The relationship of plate 43 to plates 44 and 45 also applies to plates 45 and 46, 46 and 47, and 47 and 44 as plate 43 continues to rotate. In fact, the same relationships are established without discontinuity at any point throughout one complete turn.

Figure 11:
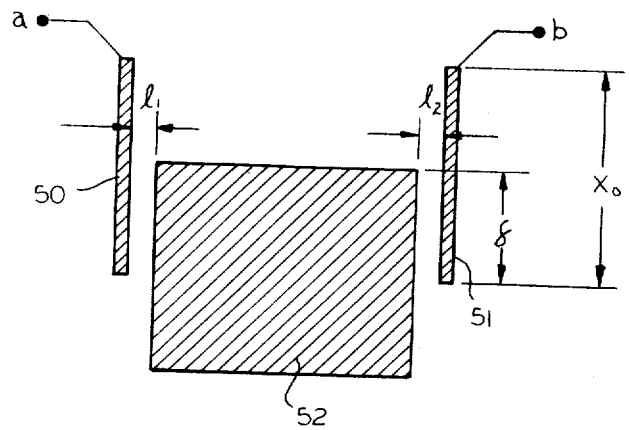
FIG. 11 is a simplified mechanical cross-sectional view of the rotary capacitor portion of a transducer constructed in accordance with the invention.

The output voltage $e_0$ can now be obtained by applying the output signal obtained from plate 43 to a buffer amplifier. Heretofore electric signals were taken out from rotary plates such as plate 43 by means of brushes and slip rings. However, as has been previously discussed, such methods may provide poor reliability because of insufficient electrical contact. The present invention provides a contactless system. Referring to FIG. 11, plates 50 and 51 are rectangular plates of an identical shape accurately positioned in parallel spaced-apart relationship. These plates are separated sufficiently so that the capacity effect produced between them can be disregarded. Then, by means of a thick plate 52 which is identical to plates 50 and 51 in confronting area, the effective gap between plate 50 and 51 is decreased by as much as the thickness of the plate 52 and is narrowed to the sum of the gap $l_1$ between the plates 50 and 52 and the gap $l_2$ between plates 52 and 51. Thus, capacity effect is re-established between the plates 50 and 51 by plate 52.

Assuming that the insertion length of plate 52 between plates 50 and 51 is $\delta$, the length $\delta$ is freely variable within the range of $0 \leq \delta \leq X_0$ (wherein $X_0$ represents the width of the plates 50, 51, or 52, and also assuming that the effective gap $l_1 + l_2 + l$ is determined to be constant and that the fringe effect is negligible, the effective capacity $C_e$ between plates 50 and 51 can be expressed as follows:

$$C_e = C_f \delta / X_0 + C_0$$

(15)

wherein $C_f$ represents the capacity effect obtained when $\delta = X_0$, i.e., when the plate 52 is completely inserted in between the plates 50 and 51 and wherein $C_0$ represents the stray capacity (of negligible value) obtained when $\delta = 0$, i.e., before the insertion of plate 52.

Figure 12:
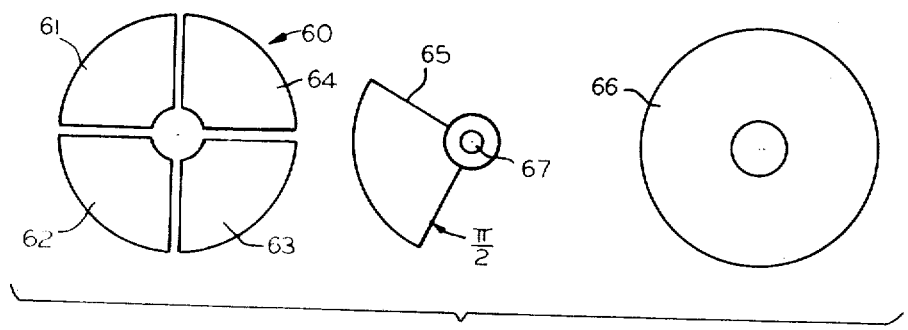
FIG. 12 shows the disassembled component parts of a preferred form of transducer construction.
Figure 13:
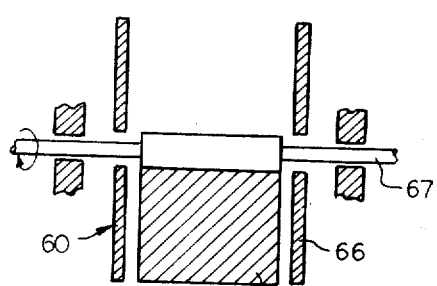
FIG. 13 is a simplified cross-sectional view of the transducer useful in explaining the principles of its operation.

FIGS. 12 and 13 illustrate a possible construction for the rotary capacitor type transducer constructed in accordance with the present invention. The transcuder comprises a stator plate 60 which is divided into four wedge-shaped segments 61–64, as shown in FIG. 12; a rotary wedge-shaped sector plate 65 shaped at an angle of $\pi/2$, and a disc-shaped confronting plate 66 which is not divided. These elements are combined as shown in FIG. 13, a capacity effect being formed between the plates 60 and 66 dependent on the angular position of plate 65. The operation of this arrangement is almost identical to that of the arrangement shown in FIG. 9 wherein a capacity effect is formed between the plates 43 and 44–47. In the case of the rotary capacitor shown in FIG. 13, however, it is not necessary that plate 66 rotate. Instead, plate 65 rotates to generate the desired shaft position indication signal. Plate 65 is mounted on a rotary shaft 67 so as to be electrically insulated from plates 60 and 66. Thus, FIG. 13 illustrates a rotary capacitor-type transducer having no electrical contacts at all.

It has been explained that the plates 60 and 66 are sufficiently apart from each other so that the capacity effect between them is negligible. The gap between the plates 60 and 66, however, is limited. Therefore, it appears possible that some capacity effect could exist from plate 60 to plate 66 in the area not covered by plate 65 and that this might cause an error in measurement. In the transducer of the invention, however, the errors caused by such capacity effect are not significant in a manner which will be presently explained.

Figure 14:
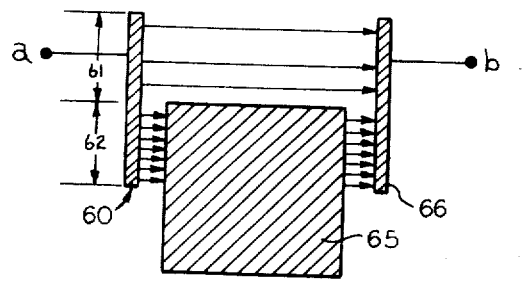
FIG. 14 is a cross-sectional view of the principal components of the transducer showing the electrical coaction between them.
Figure 15:
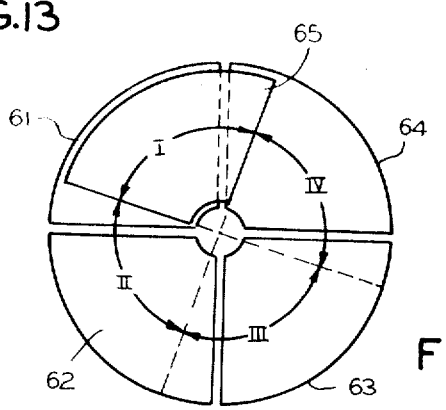
FIG. 15 is a simplified end view of the transducer useful in explaining the principle of its operation.
Figure 16:
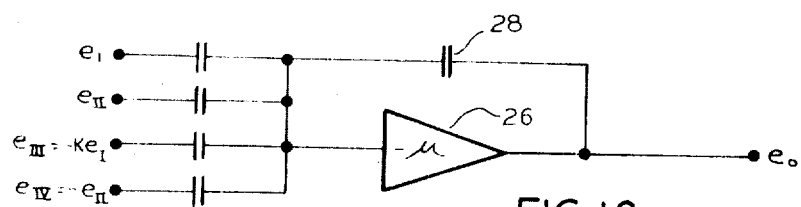
FIG. 16 is a simplified schematic diagram of part of the signal processing portion of the transducer.

FIGS. 14, 15 and 16 illustrate how errors in measurement due to the capacity effect between plates 60 and 66 are precluded. Electrostatic lines of force are indicated in FIG. 14 by arrows. In FIG. 11, the electrostatic lines of force exist only through plate 52 while there exist no direct electrostatic lines of force from plate 60 to plate 66 because of their great separation. In FIG. 14, which represents a practical structure of the rotary capacitor portion of the transducer, the distance between plates is limited, so that a capacity effect is realized not only from segment 62 of plate 60 but also from segment 61, and a composite value of such capacity effect appears on confronting plate 66. Referring to FIG. 15, with rotor plate 65 positioned as shown, the whole region may be considered to be divided into four regions I through IV. For simplification, confronting plate 66 has been omitted from the illustration. Region I confronts plates 60 and 66. A capacity effect should be formed in this region while no significant capacity effect to the plate 66 should in regions II, III, and IV. However, because of its shape, plate 66 is affected by the portion of the plate 60 corresponding to regions II, III, and IV, However, note that region II is inducing voltage of opposite phase to that of the voltage being induced in region IV, even though the waveforms are the same. The same relationship obtains between regions I and III. Moreover, the peak value of the voltage induced in region II is substantially equal to that induced in region IV.

As for the regions I and III, the capacity effect to plate 66 is obviously much greater in region I than in region III irrespective of the limitation in shape. In short, the resultant induced voltages in regions II and IV are eliminated by mutual cancellation while the desired capacitivity induced voltage in region I is only slightly affected by induction through region III. The effect of region III does not deform the waveform of the desired induced voltage in region I, but merely reduces its amplitude. This is illustrated by FIG. 16, wherein $e_I$, $e_{II}$, $e_{III}$ and $e_{IV}$ respectively represent the induced voltage through regions I, II, III, and IV. The value of $e_{III}$ is equal to $-Ke_I$ and $K < 1$. However, it will be recalled that the expansion or contraction of the waveform of the output voltage does not affect the transition point.

In FIGS. 11, 13 and 14 the rotor plate 65 has been illustrated as a very thick plate. Theoretically, however, any thickness of plate 65 suffices as long as it can make a difference in the length of the electrostatic lines of force from plate 60 to plate 66. It has been found experimentally that the degree of error due to fringe effect is negligible and generally does not require any compensation in practicing this invention. However, in order to minimize the result of the fringe effect, each plate may be modified into a suitable shape.

Figure 17:
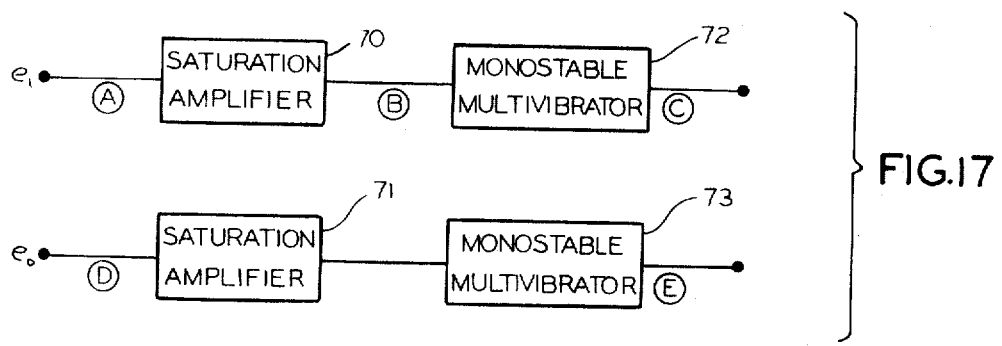
FIG. 17 is a functional block diagram of part of the signal processing circuit of the transducer.
Figure 18:
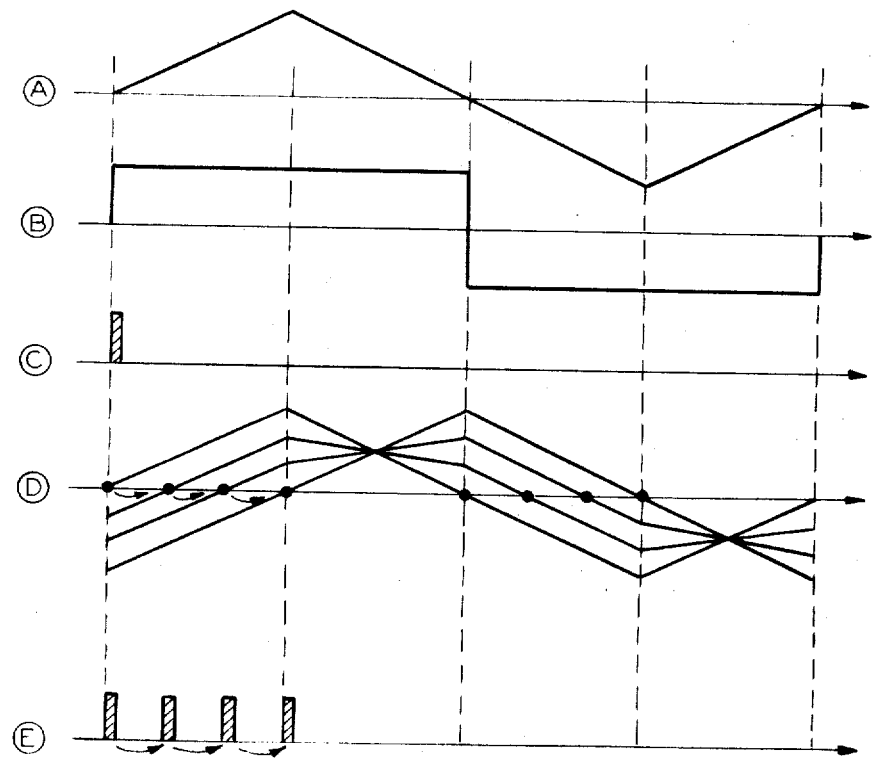
FIG. 18 is a presentation of waveforms useful in illustrating the operation of the circuits of FIGS. 16 and 17 in conjunction with the transducer of FIG. 9.

FIG. 17 is a block diagram showing a typical application of the invention. The system of FIG. 17 comprises two saturation amplifiers 70 and 71 and two monostable multivibrators 72 and 73. The waveform in each part of this system is as shown in FIG. 18. The triangular wave of the excitation power supply $e_1$ as shown by plot A is changed by saturation amplifier 70 into a rectangular wave as shown by plot B, and then converted to a differentiated waveform as shown by plot C through monostable multivibrator 72. In the same manner the output voltage $e_0$ from the rotary capacitor shown by plot D is taken from monostable multivibrator 73 as a series of pulses as shown in plot E, the position of the pulses being dependent on the transition point, or the rotational angle measured by the transducer.

Figure 19:
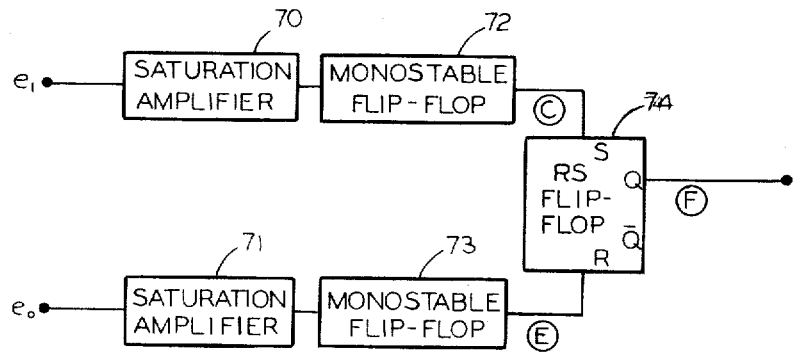
FIG. 19 is a functional block diagram of part of the signal processing portion of the transducer.
Figure 20:
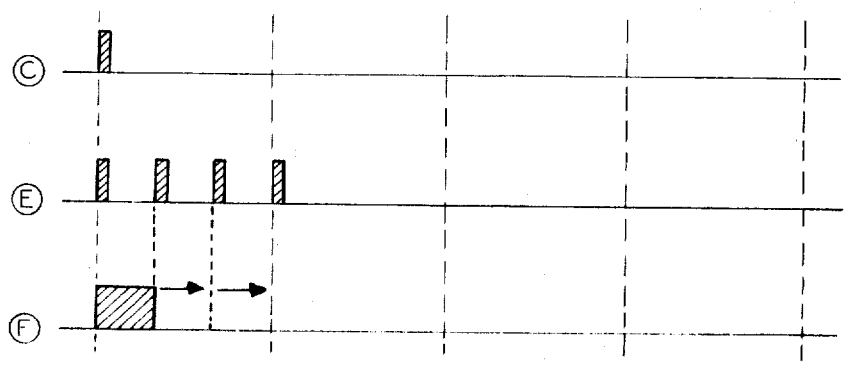
FIG. 20 is a presentation of waveforms useful in illustrating the operation of the circuit of FIG. 19 in conjunction with the transducer of FIG. 9.

FIG. 19 is a block diagram showing the addition of an RS flip-flop 74 to the circuit fo FIG. 17. The waveform developed in each part of this circuit is as shown in FIG. 20. The set input of flip-flop 74 is controlled by the constant interval trigger pulse of waveform C while the reset input is controlled by the signal of waveform E to obtain the width-modulated output pulse of waveform F.

Thus, in accordance with the invention, the output of the rotary capacitor portion of the transducer comprises a modulated signal, allowing the transducer to be employed as a rotation angle transmitter for remote transmission. Unlike prior-art rotary capacitor-type rotational angle transducers which show the rotation angle in terms of a voltage level, the present system requires no regulated power supply, which is very advantageous for remote telemetering applications.

In the applications herein described a 4-phase system is employed. However, systems of 3 or more phases may be employed. From the viewpoint of economy, a 3-phase system is most suitable. In cases where higher accuracy is required, however, a system of 5 or more phases may be employed to minimize the error attributable to the structural imperfections of the rotary capacitor.

As previously mentioned, this invention is based on the principle that the phase difference between the voltage of one of the excited sectors of the stator plate and the phase of the AC voltage taken out without contact from the rotor plate when it comes to cross the zero voltage level, i.e., the phase in the interval from the instant the exciting AC voltage shifts from negative to positive till the next shifting takes place in output voltage, is exactly proportional to the rotation angle of the rotary plate. From this, the rotation angle is obtained as a pulse position modulated (PPM) or pulse width modulated (PWM) output signal. This invention thus provides a highly efficient rotational angle transducer of a very simple structure.

It will be understood that modifications and variations may be effected without departing from the scope of the novel concepts of the present invention, but it is understood that this application is to be limited only by the scope of the appended claims.

The invention is hereby claimed, as follows:

1. A contactless rotational angle transducer for generating an output signal indicative of the angular position of a rotatable member, comprising:
   a stator plate divided into a plurality of electrically insulated sector members;
   means for impressing exciting voltages having a triangular waveform on adjacent ones of said sector members, the phase of each impressed voltage differing by $2\pi/n$ from that impressed on adjacent members where $n$ equals the number of sector members;
   a confronting plate disposed in parallel spaced-apart and aligned relationship to said stator plate so as to develop an induced voltage in response to said impressed exciting voltages on said sector members;
   a sector rotor plate rotatably coupled to said rotatable member and disposed in parallel relationship between said stator plate and said confronting plate for modifying the voltage induced on said confronting plate; and
   signal generating means responsive to the phase difference between the signal induced in said confronting plate and the voltage impressed on a selected one of said sector members for generating a pulse-modulated output signal indicative of the angular position of said rotatable member.

2. A rotational angle transducer as defined in claim 1 wherein the face area of the rotor plate is substantially the same as that of each of the sector members.

3. A rotational angle transducer as defined in claim 1 wherein said sector members each extend over an angle of approximately $2\pi/n$ about the rotational axis of said rotatable member.

4. A rotational angle transducer as defined in claim 3 wherein said sector rotor plate extends over an angle of approximately $2\pi/n$ about the rotational axis of said rotatable member.

5. A rotational angle transducer as defined in claim 4 wherein $n$ is an integer greater than or equal to 3.

6. A rotational angle transducer as defined in claim 5 wherein said sector members and said rotor plate are substantially wedge-shaped in cross-section.

7. A rotational angle transducer as defined in claim 6 wherein said confronting plate is annular in cross-section, and said rotor plate, stator members and confronting plate are of substantially equal radius.

8. A rotational angle transducer as defined in claim 1 wherein said exciting voltages have substantially identical peak levels.

9. A rotational angle transducer as defined in claim 1 wherein said signal generating means comprise means responsive to the phase of said impressed exciting voltages for initiating an output pulse, and means responsive to the phase of said induced voltage on said confronting plate for terminating said output pulse, thereby generating an output pulse having a width indicative of the angular position of said rotatable member.

10. A contactless rotational angle transducer for generating an output signal indicative of the angular position of a rotatable member, comprising:
   a stator plate divided into n electrically insulated sector members each of which extends over an angle of approximately $2\pi/n$ about the rotational axis of said rotatable member;
   means for impressing exciting voltages having a triangular waveform on adjacent ones of said sector members, the phase of said impressed voltages differing by $2\pi/n$ between adjacent members;
   a confronting plate disposed in parallel spaced-apart relationship to said stator plate so as to develop an induced voltage in response to said impressed exciting voltages on said sector members of said stator plate;
   a sector rotor plate rotatably coupled to said rotatable member and extending over an angle of approximately $2\pi/n$ about the rotational axis of said rotatable member, said rotor plate being disposed in parallel relationship between said stator plate and said confronting plate; and signal generating means responsive to the phase difference between the exciting voltage impressed on a selected one of said sector members and the voltage induced on said confronting plate for generating a pulse-modulated output signal indicative of the angular position of said rotatable member.

11. A rotational angle transducer as defined in claim 10 wherein said sector stator members and said rotor member are substantially wedge-shaped in cross-section, and said confronting plate is substantially annular in cross-section.

12. A rotational angle transducer as defined in claim 11 wherein said rotor, stator and confronting plates are of substantially equal radius.

13. A rotational angle transducer as defined in claim 10 wherein said signal generating means comprise a bi-stable switching element which is switched to one state upon occurrence of a predetermined phase condition in said impressed exciting voltage, and to its other state upon occurrence of a predetermined phase condition in the signal induced on said confronting plate.

14. A rotational angle transducer as defined in claim 13 wherein a first monostable multivibrator is provided for applying the signal induced on said confronting plate to one input terminal of said bi-stable switching element, and wherein a second monostable multivibrator is provided for applying the signal impressed on said selected sector member to the other input terminal of said bi-stable switching element.

15. A rotational angle transducer as defined in claim 10 wherein a pulse position modulated signal is obtained from said signal generating means.

* * * * *